(12) United States Patent
Schneider (10) Patent No.: US 10,410,073 B2
(45) Date of Patent: Sep. 10, 2019

(54) DRIVER ASSISTANCE OF A MOTOR VEHICLE

(71) Applicant: Lucas Automotive GmbH, Koblenz (DE)

(72) Inventor: Georg Schneider, Urbar (DE)

(73) Assignee: LUCAS AUTOMOTIVE GMBH, Koblenz (DE)

(*) Notice: Subject to any disclaimer, the term of this patent is extended or adjusted under 35 U.S.C. 154(b) by 0 days.

(21) Appl. No.: 15/837,051

(22) Filed: Dec. 11, 2017

(65) Prior Publication Data

US 2018/0181825 A1 Jun. 28, 2018

(30) Foreign Application Priority Data

Dec. 23, 2016 (DE) .................. 10 2016 015 513

(51) Int. Cl.
| | |
|---|---|
| *G06K 9/00* | (2006.01) |
| *B60W 50/14* | (2012.01) |
| *G08G 1/0962* | (2006.01) |
| *B60K 35/00* | (2006.01) |
| *G01C 21/36* | (2006.01) |

(Continued)

(52) U.S. Cl.
CPC .......... *G06K 9/00818* (2013.01); *B60K 35/00* (2013.01); *B60W 50/14* (2013.01); *G01C 21/3602* (2013.01); *G01C 21/3697* (2013.01); *G06K 9/24* (2013.01); *G08G 1/09623* (2013.01); *G08G 1/09626* (2013.01);

(Continued)

(58) Field of Classification Search
CPC ...... G06K 9/00818; G06K 9/24; B60K 35/00; B60W 2050/146; B60W 2250/22; G01C 21/3602
See application file for complete search history.

(56) References Cited

U.S. PATENT DOCUMENTS

| | | |
|---|---|---|
| 6,560,529 B1 | 5/2003 | Janssen |
| 2008/0056535 A1 | 3/2008 | Bergmann et al. |
| 2012/0150428 A1 | 6/2012 | Nem et al. |

*Primary Examiner* — Eric Blount
(74) *Attorney, Agent, or Firm* — Tarolli, Sundheim, Covell & Tummino LLP (57) ABSTRACT

Driver assistance system of a motor vehicle, to be connected with a navigation unit and a camera unit; wherein the navigation unit is adapted to access map data representing road segments of a road network located in the geographic proximity of the motor vehicle and road signs located on the road segments, to determine a current position of the motor vehicle located on a road segment, and to provide first information of at least one road sign to the driver assistance system, which road sign is located on a position of a road segment to be traveled by the motor vehicle based on the current position of the motor vehicle. The driver assistance system is adapted to provide second information of the at least one road sign to the camera unit based on the first information provided by the navigation unit. The camera unit is adapted to capture an environment of the motor vehicle, to match the captured environment of the motor vehicle with the second information, to detect a road sign substantially coinciding with the second information in the captured environment, and to provide third information of the at least one detected road sign to the driver assistance system. The driver assistance system is further adapted to output a corresponding signalling to the driver of the motor vehicle or a velocity affecting unit of the motor vehicle based on the third information provided by the camera unit.

23 Claims, 4 Drawing Sheets

(51) Int. Cl.
*G06K 9/24* (2006.01)
*G08G 1/0967* (2006.01)
(52) U.S. Cl.
CPC . *G08G 1/096725* (2013.01); *B60W 2050/146* (2013.01); *B60W 2550/22* (2013.01)

Fig. 1

DRIVER ASSISTANCE OF A MOTOR VEHICLE

RELATED APPLICATION

This application claims priority from German Application No. 10 2016 015 513.2, filed Dec. 23, 2016, the subject matter of which is incorporated herein by reference in its entirety.

BACKGROUND OF THE INVENTION

The invention relates to a driver assistance system of a motor vehicle, and to a method for outputting traffic information to a driver or a velocity affecting unit of the motor vehicle.

PRIOR ART

Driver assistance systems for motor vehicles are known which comprise a camera sensor and a navigation system. The navigation system provides information from a stored map database about roads and a particular position of the motor vehicle, and the camera sensor detects an environment of the motor vehicle, in particular road signs. The data from the navigation system and the camera sensor are merged in the driver assistance system in order to ensure maximum availability and accuracy of the system. Detection of the road sign by the camera sensor is a computationally intensive task of the camera sensor and is susceptible to errors if the image is recorded under difficult conditions, such as, for example, in rain or snow.

OBJECT

In order to reduce the computational effort of the driver assistance system, or of the camera unit, the invention is concerned with the object of simplifying and making more precise the detection of road signs, and at the same time minimising a computational effort.

PROPOSED SOLUTION

There is proposed as a solution a driver assistance system of a motor vehicle defined in patent claim 1. The driver assistance system is to be connected with a navigation unit and a camera unit. The navigation unit is adapted to access map data representing road segments of a road network located in the geographic proximity of the motor vehicle and road signs located on the road segments, to determine a current position of the motor vehicle located on a road segment, and to provide first Information of at least one road sign to the driver assistance system, which road sign is located on a position of a road segment to be traveled by the motor vehicle based on the current position of the motor vehicle. The driver assistance system is adapted to provide second information of the at least one road sign to the camera unit based on the first information provided by the navigation unit. The camera unit is adapted to capture an environment of the motor vehicle, to match the captured environment of the motor vehicle with the second information, to detect a road sign substantially coinciding with the second information in the captured environment, and to provide third information of the at least one detected road sign to the driver assistance system. The driver assistance system is further adapted to output a corresponding signalling to the driver of the motor vehicle or a velocity affecting unit of the motor vehicle based on the third information provided by the camera unit.

The velocity affecting unit can be adapted to maintain or to change a velocity with which the motor vehicle is currently moving. The velocity affecting unit can be a cruise control device.

The driver assistance system can be connected to an in-car electronics system of the motor vehicle or can be part thereof.

The navigation unit can be adapted to determine the current position of the motor vehicle based on a signal, in particular a GPS signal, from at least a satellites a radio network, the global system for mobile communication (GSM), an inert or autonomous system, the signal comprising geo-information (topological, road, aviation and/or nautical maps). The navigation unit also accesses map data which can be stored in a memory of the navigation unit, are provided in the form of an external data carrier and/or by a cloud system.

The camera unit can be a time-of-flight, TOF, camera. The camera unit can be adapted to capture the environment of the motor vehicle by means of white light, infra-red light and/or a laser.

The at least one road sign can be a read sign which requires a current velocity of the motor vehicle to be adjusted by the driver assistance system, the velocity affecting unit or the driver of the motor vehicle.

The first and/or second information can comprise information about a form of the at least one road sign and/or a street name, place name, country name and/or point of interest, POI, name depicted on the at least one road sign, and/or a symbol depicted on the at least one road sign.

The first and/or second information can comprise information about a colour and/or colour combination of the at least one road sign, and/or a distance and/or time from the current position of the vehicle to the road sign.

The first and/or second information can comprise information about a combination of at least the form of the at least one road sign, and/or the colour, the colour combination of the at least one road sign, and/or the street name, place name (230), country name, point of interest, POI, name depicted on the at least one road sign, the symbol depicted on the at least one road sign, the distance and/or time from the current position of the vehicle to the at least one road sign.

The first and/or second information can also comprise information about a category of the at least one road sign, the categories including a warning road sign, town-/place-name road sign, regulatory road sign, directional road sign, traffic facility road sign and/or supplementary road sign category. Individual road signs of the different categories are defined by the road traffic act.

The first information and the second information can be identical.

The camera unit can further be adapted to divide the captured environment into a predetermined number of image regions before it matches the captured environment of the motor vehicle with the second information, and to detect the element of the captured environment in the form of the at least one road sign within at least one selected Image region of the predetermined number of image regions. The image regions are preferably regions of the captured environment of equal size. Many road signs are arranged at a predetermined height in order to make them as visible as possible for the large number of road users. The camera unit can accordingly be adapted to exclude specific image regions that are below this specific height when detecting the at least one road sign.

Furthermore, the third information can comprise information about a partial area of the captured environment, the partial area comprising the at least one detected road sign. The partial area can correspond to an image region of the predetermined number of image regions.

In particular, the Information about the partial area can comprise only the at least one detected road sign.

Alternatively, the third information can comprise information confirming that the camera unit has detected the at least one road sign.

As a further alternative solution there is proposed a motor vehicle according to patent claim 11 which comprises a driver assistance system according to one of the preceding proposed solution.

For a further solution there is proposed a method for outputting traffic information to a driver or a velocity affecting unit of a motor vehicle according to patent claim 12. The method comprises the following steps: comprising the steps: accessing map data representing road segments of a road network located in the geographic proximity of the motor vehicle and road signs located on the road segments; determining a current position of the motor vehicle on a road segment; providing first information of at least one road sign which is located on a position of a road segment to be traveled by the motor vehicle based on the current position of the motor vehicle; providing second information of the at least one road sign based on the first information; capturing an environment of the motor vehicle; matching the captured environment of the motor vehicle with the second information; detecting a road sign substantially coinciding with the second information in the captured environment; providing third information of the at least one detected road sign; and outputting a corresponding signalling to the driver or the velocity affecting unit of the motor vehicle based on the third information provided.

The at least one road sign can be a road sign which requires a current velocity of the motor vehicle to be adjusted by a driver assistance system, the velocity affecting unit or the driver of the motor vehicle.

The first and/or second information can comprise information about a form of the at least one road sign and/or a street name, place name, country name and/or point of interest, POI, name depicted on the at least one road sign, and/or a symbol depicted on the at least one road sign.

The first and/or second information can comprise information about a colour and/or colour combination of the at least one road sign, and/or a distance and/or time from the current position of the vehicle to the road sign.

The first and/or second information can comprise information about a combination of at least the form of the at least one road sign, and/or the colour, the colour combination of the at least one road sign, and/or the street name, place name, country name, point of interest POI, name depicted on the feast one road sign, the symbol depicted on the at least one read sign, the distance and/or time from the current position of the vehicle to the at least one road sign.

The first information and the second information can fee identical.

Before the step of matching the captured environment of the motor vehicle with the second information, the captured environment can be divided Into a predetermined number of image regions, and the at least one road sign is detected within at least one selected image region of the predetermined number of image regions.

The third information can comprise Information about a partial area of the captured environment, the partial area comprising the at least one detected road sign.

The information about the partial area can comprise only the at least one detected road sign.

Alternatively, the third information can comprise information confirming that the at least one road sign has been detected.

As a further alternative solution there is proposed a computer program product according to patent claim 22, comprising program code sections for carrying out a method according to one of the preceding aspects when the computer program product is executed on one or more processing unite.

The computer program product can be stored on one or more computer-readable storage media.

BRIEF DESCRIPTION OF THE FIGURES

Further details, features, advantages and effects of the method and devices described herein will become apparent from the following description of currently preferred variants, and from the drawings, in which.

DETAILED DESCRIPTION OF THE DRAWINGS

Figure 1:
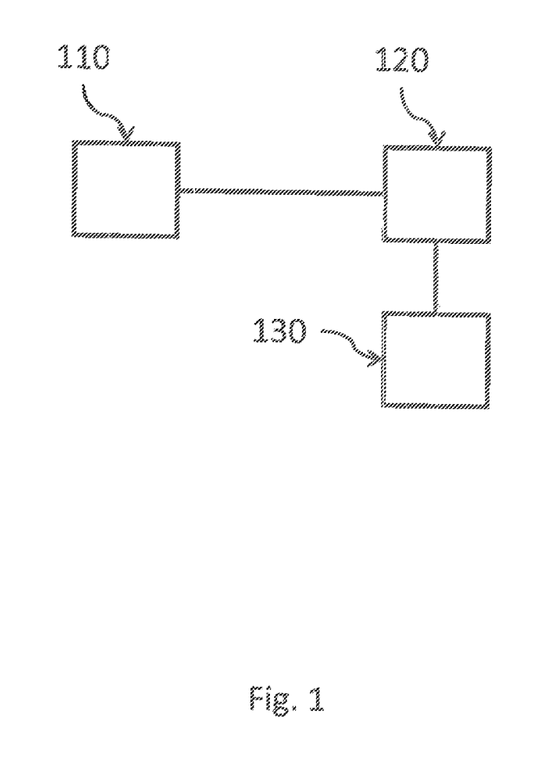
FIG. 1 is a schematic representation of a driver assistance system of a motor vehicle according to a first embodiment.

In FIG. 1 there are shown schematically a camera unit 110, a driver assistance system 120 and a navigation unit 130, wherein the camera unit 110, the driver assistance system 120 and the navigation unit 130 can be contained in a motor vehicle (not shown). The camera unit 110 is connected to the driver assistance system 120, which in turn is connected to the navigation unit 130.

The navigation unit 130 is adapted to access map data representing road segments 210 of a road network located in the geographic proximity of the motor vehicle and road signs located on the road segments 210. The navigation unit 130 can accordingly be adapted to determine the current position of the motor vehicle based on a signal, in particular a GPS signal, from at least a satellite, a radio network, the global system for mobile communication (GSM), an inert or autonomous system. The signal can comprise different geo-information, such as topological, road, aviation and/or nautical map information. The navigation unit 130 can further access map data which are stored in a memory of the navigation unit 130, provided in the form of an external data carrier and/or by a cloud system. The map data can be provided in the form of road segments 210 and nodes, a connection between two nodes being a road segment 210.

The navigation unit 130 provides the driver assistance system 120 with first information about at least one road sign 220 which is located at a position on a road segment 210 to be traveled by the motor vehicle based on the current position of the motor vehicle. The at least one road sign 220 can be located in front of, to the side of or behind the motor vehicle.

The driver assistance system 120 is adapted to provide the camera unit 110 with second information about the at least one road sign 220 based on the first information.

The second information can be the same as the first information. Alternatively, in order to reduce the amount of information and thus the computational effort in a first step, the second information can comprise only part of the first information.

The at least one road sign is preferably a road sign 220 which requires a current velocity of the motor vehicle to be adjusted by the driver assistance system 120, a velocity affecting unit or the driver of the motor vehicle. The velocity affecting unit can be a cruise control device of the motor vehicle. By limiting to such road signs 220, the number of road signs 220 which are to be detected by the camera unit 110 (as will be explained hereinbelow) can already be reduced significantly. The driver assistance system 120 is intended to support and assist the driver of the motor vehicle, in particular when driving, so that assistance with speed adjustment by detection of road signs and thus traffic regulations takes the burden off the driver and increases his safety.

The camera unit 110 can be a time-of-flight, TOF, camera. The camera unit 110 can be adapted to capture the environment of the motor vehicle by means of white light, infra-red light and/or a laser. The camera unit 110 is adapted to capture an environment of the motor vehicle (see FIG. 2). The camera unit 110 can thereby capture a series of images or a continuous recording of the environment. The captured environment is subsequently scanned by the camera unit 110 in order to detect a road sign 220 which substantially coincides with the second information in the captured environment. If the camera unit 110 has detected the road sign 220 coinciding with the second information, the camera unit 110 provides the driver assistance system 120 with third information about the detected road sign 220.

The third information can comprise information about a partial area of the captured environment in which the detected road sign 220 is contained. Since the only relevant factor for the driver assistance system 120 is whether the at least one road sign 220 has bean detected, the driver assistance system 120 does not require a complete recording of the captured environment (see FIG. 2, for example) but merely the part in which the at least one road sign 220 is arranged. The partial area can also comprise only the road sign 220.

Figure 2:
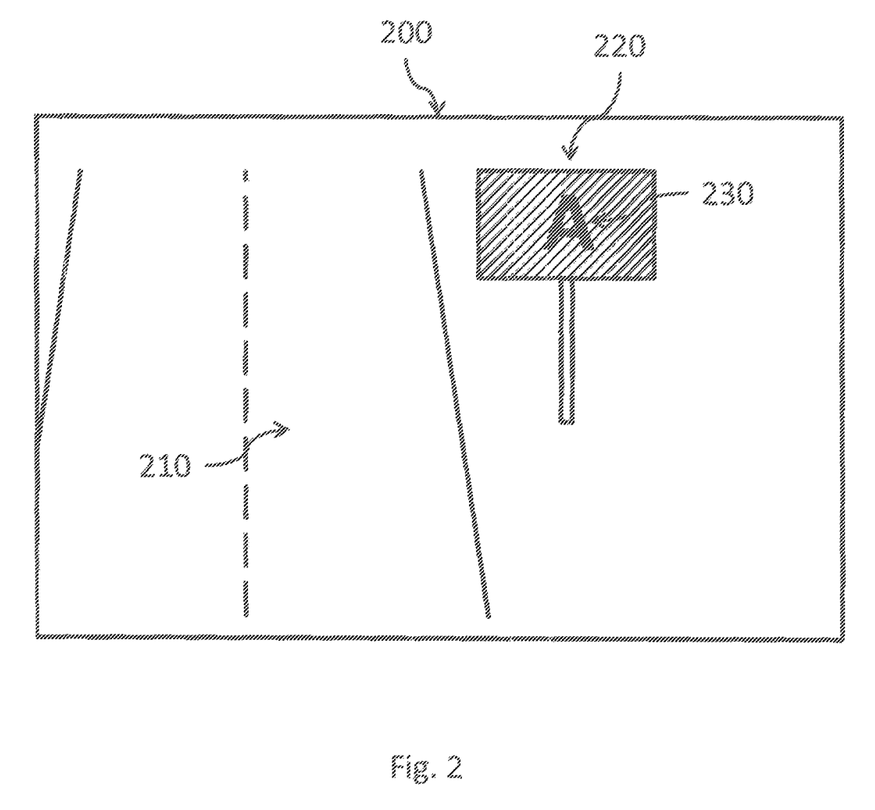
FIGS. 2 and 3 are schematic representations of a captured environment of a camera unit of the driver assistance system.

Alternatively, the third information can comprise only confirmation information which confirms for the driver assistance system 120 that the at least one road sign 220 has been detected. Confirmation information likewise means minimal data quantities and thus simplified processing for the driver assistance system 120.

Based on the third information, the driver assistance system 120 outputs a corresponding signalling to the driver or the velocity affecting unit of the motor vehicle. The signalling to the driver can comprise, for example, an output via a loudspeaker or a display unit of the motor vehicle, the output indicating to the driver an upcoming or already applicable velocity regulation. The output can also comprise additional information for the driver, for example how far it is to the road sign 220 and/or when and/or where the current velocity should be reduced if a lower velocity is specified. Signalling to the velocity affecting unit can comprise information about the upcoming prescribed velocity limit, a distance to the road sign and/or a time until the road sign 220 is reached, based on a current velocity. Based on this information, the velocity affecting unit can affect the current velocity in good time.

As has already been mentioned hereinbefore, the camera unit 110 is to detect the at least one road sign 220 more precisely and with less computational effort. In order to permit this, the driver assistance system 120 can reduce the information provided to the camera unit 110 in such a manner that it represents a minimal computational effort for the camera unit 110 but permits simple and precise detection of the at least one road sign 220. This will be explained in greater detail with reference to FIG. 2.

FIG. 2 shows an environment captured by the camera unit 110 in the form of a partial area 200. The partial area 200 comprises parts of a road segment 210 and a road sign 220.

In order to increase the computational effort and the precision of the camera unit 110, the driver assistance system 120 is adapted to provide the second Information based on the first information. Accordingly, the first and/or second information can comprise information about a form of the at least one road sign 220 and/or a street name, place name 230, country name and/or point of interest, POI, name deplected on the at least one road sign 220, and/or a symbol depicted on the at least one road sign 220.

It is a common feature of this type of information that it prescribes geometric properties of the at least one road sign 220. By limiting the second information to the form of the at least one road sign 220, for example the form of a place-name sign, the camera unit 110 is able purposively to search for a rectangle-shaped sign in the captured environment. Accordingly, when seeking the at least one road sign 220, colour information can be ignored.

The camera unit 110 can further be adapted to depict or transform the geometric properties of the at least one road sign 220 at a different perspective. Not all road signs 220 are positioned on road segments as is shown in FIG. 2, but they can also be inclined or turned. Despite the sign being Inclined or turned, the form still has the same geometric properties. Accordingly, the camera unit 110 can be adapted to detect an inclined or turned road sign 220 based on the second information.

If the second information comprises information about a piece name 230 (in FIG. 2 place "A"), the camera unit 110, based on geometric properties of the letter "A", can purposively search the captured environment for that letter and accordingly detect the at least one road sign 220, in this case the place-name sign "A" 230.

If the second information contains several pieces of information about the at least one road sign 220, for example the place name and form of the at least one road sign 220, better differentiation from other road signs 220 by the camera unit 110 is possible.

The camera unit 110 can further be adapted to detect the at least one road sign 220 based on the second information without having completely captured the at least one road sign 220 in the environment. A typical situation in which the at least one road sign 220 cannot be captured completely is, for example, when the at least one road sign 220 is partially obscured by a tree so that only a specific part of the at least one road sign 220 is still detectable. The camera unit 110 can be adapted to detect the part of the at least one road sign 220 based on the second information, and to provide the driver assistance system 120 with the third information on the basis of that detected part of the at least one road sign 220 alone. Optionally or in addition, the camera unit 110 can be adapted to identify the at least one road sign 220 completely by optical reconstruction and then provide the driver assistance system 120 with the third information.

The first and/or second information can further comprise information about a colour and/or colour combination of the at least one road sign 220, and/or a distance and/or time from the current position of the motor vehicle to the at least one road sign 220.

Road signs 220 are characterised by specific colours. Furthermore, road signs 220 are to be readily visible during the day, at twilight and at night. Accordingly, road signs 220 have so-called retroreflective films which reflect light from a radiation source back to the source. The minimum required reflection values are specified by DIN 67520. Furthermore, different reflection classes are defined, so-called RA classes, which correspond either to DIN 67520; DIN EN 12899-1 or DIN 67520. Accordingly, the colours of the road signs 220 are clearly specified and can be used by the camera unit 110 for better detection and differentiation from other components of the environment.

If the second information comprises information about the time and/or distance from the current position of the motor vehicle to the at least one road sign 220, the camera unit 110 can be adapted to search for the at least one road sign 220 only within a specific distance and/or time interval. By further specifying a moment, a time window or a road section in which the at least one road sign 220 is to be detected, the precision with which the at least one road sign 220 is detected can be increased.

Further interference factors in the detection of the at least one road sign 220 can be, for example, rain, snow or fog. These can make accurate capture of the environment and thus of the at least one road sign 220 more difficult. However, the camera unit 110 is adapted clearly to detect the at least one road sign 220 with the aid of the second information even if the camera unit 110 does not detect the at least one road sign completely or portions of the at least one road sign 220 have not been captured sharply, for example due to the diffusion of light at raindrops.

The second information can further comprise a combination of the information listed hereinbefore.

Figure 3:
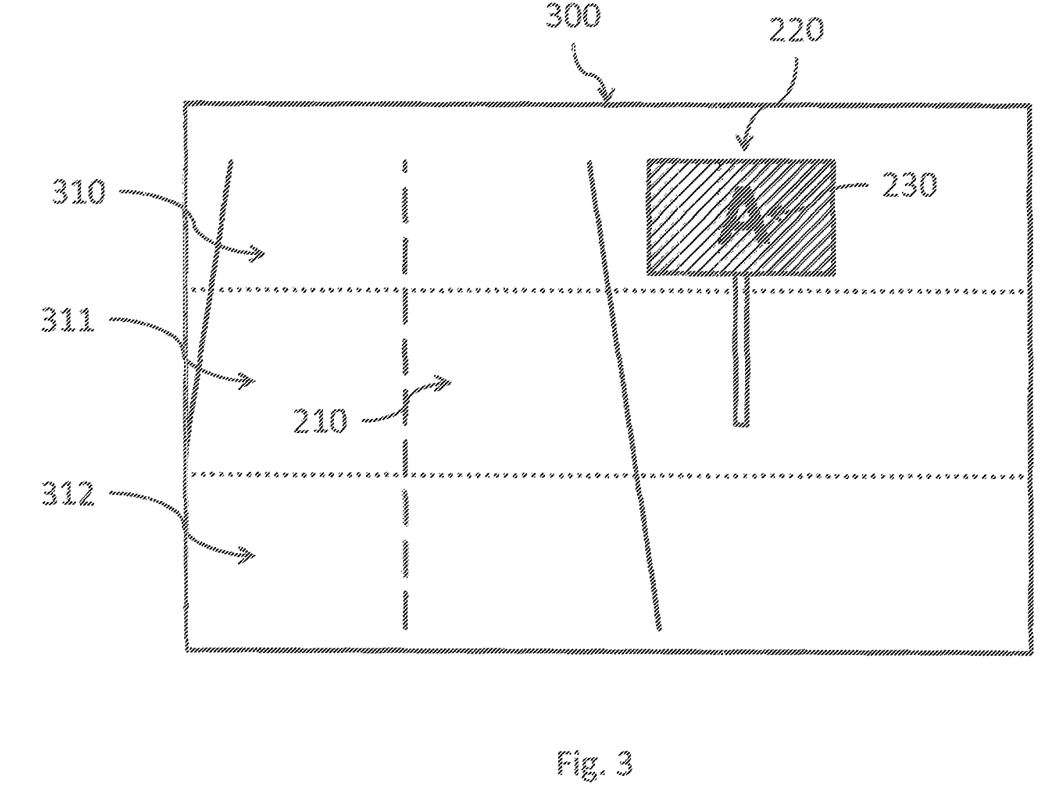

As is shown in FIG. 3, the camera unit 110 is adapted to divide an image 300 of the captured environment into a predetermined number of image regions 310, 311, 312. In FIG. 3, the image 300 is divided into three image regions 310, 311, 312 of equal size, the predetermined number not being limited to this number of image regions 310, 311, 312.

Many road signs 220 are mounted in an elevated position, either by means of a support pole, as shown in FIG. 3, or also without such a support pole, for example on the wall of a house. The elevated position of the road signs 220 is to ensure that a large number of road users have a clear view thereof. Other road signs, for example a turn instruction on a multi-lane road, are depicted in the lanes in question and thus only to be found there.

Accordingly, the camera unit 110 is adapted to divide the captured environment into the image regions 310, 311, 312 and to detect the at least one road sign 220 in at least one of the image regions 310, 311, 312. The computational effort for the camera unit 110 is thus reduced significantly, since the at least one road sign 220 is sought only in a specific image region, for example Image region 310.

Figure 4:
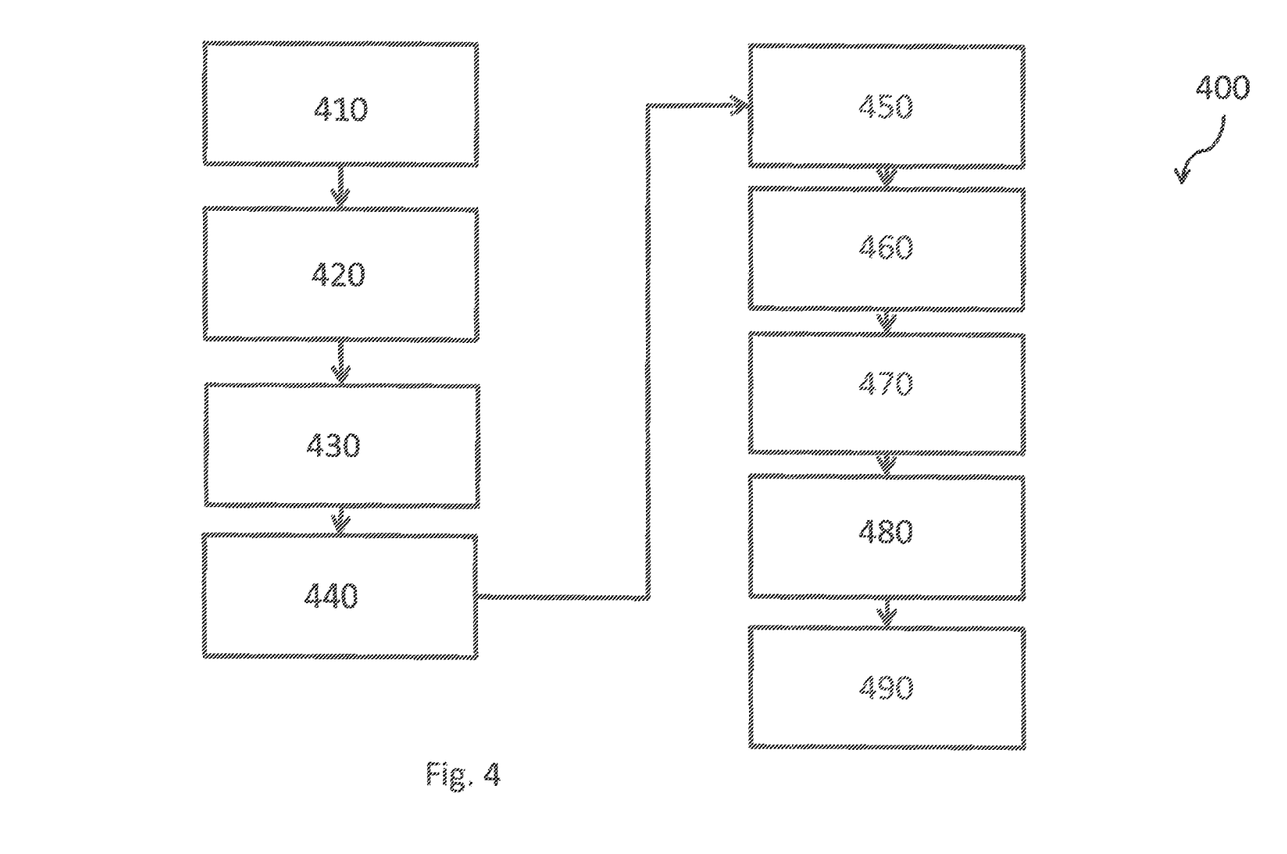
FIG. 4 is a block diagram of a method for outputting traffic information to a driver or a velocity affecting unit of a motor vehicle.

FIG. 4 shows a method 400 for outputting traffic information to the driver or the velocity affecting unit of the motor vehicle. In the method shown in FIG. 4, steps 410 to 480 can be carried out in the order described. Alternatively, various steps can be carried out in parallel, or simultaneously, or in a different order.

In step 410, map data are accessed which represent road segments 210 of a road network that are located in the geographic proximity of the motor vehicle, and road signs 220 located on the road segments 210. In step 420, first information about the at least one road sign 220, which is located on a position of a road segment 210 to be traveled by the motor vehicle based on the current position of the motor vehicle, is provided.

Based on the first information, second information is provided in step 430 which, as already described hereinbefore, is identical to the first information or comprises only parts of the first information. In step 440, an environment of the motor vehicle is captured, and in step 450 the captured environment is matched with the second information.

In step 460, a road sign 220 substantially coinciding with the second information is detected in the captured environment, and in step 470 third information about the at least one detected road sign 220 is provided. In step 480, a corresponding signalling is outputted to the driver and/or the velocity affecting unit of the motor vehicle based on the third information.

The above-described variants of the method or devices and the functional and operational aspects thereof serve merely for better understanding of the structure, the functioning and the properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described methods or devices. Combinations between all the individual implementations in the text, that is to say in every section of the description, in the claims, and also combinations between different variants in the text, in the claims and in the figures, are also comprised. For the value ranges mentioned herein, all intermediate numerical values are also disclosed.

The claims also do not limit the disclosure and thus the possible combinations of all the indicated features with one another. All the disclosed features are explicitly also disclosed herein individually and in combination with all the other features.

The invention claimed is:

1. A driver assistance system (120) of a motor vehicle, to be connected with a navigation unit (130) and a camera unit (110); wherein the navigation unit is adapted to access map data representing road segments (210) of a road network located in the geographic proximity of the motor vehicle and road signs (220) located on the road segments, to determine a current position of the motor vehicle located on a road segment, and to provide first information of at least one road sign to the driver assistance system (120), which road sign is located on a position of a road segment (210) to be traveled by the motor vehicle based on the current position of the motor vehicle;

the driver assistance system is adapted to provide second information of the at least one road sign to the camera unit based on the first information provided by the navigation unit;

the camera unit is adapted to capture an environment of the motor vehicle, to match the captured environment of the motor vehicle with the second information, to detect a road sign substantially coinciding with the second information in the captured environment, and to provide third information of the at least one detected road sign to the driver assistance system; and the driver assistance system is adapted to output a corresponding signalling to the driver of the motor vehicle or a velocity affecting unit of the motor vehicle based on the third information provided by the camera unit.

2. The driver assistance system according to claim 1, wherein the at least one road sign is a road sign which requires a current velocity of the motor vehicle to be adjusted by the driver assistance system, the velocity affecting unit or the driver of the motor vehicle.

3. The driver assistance system according to claim 1, wherein the first and/or second information comprises information about a form of the at least one road sign and/or a street name, place name (230), country name and/or point of interest, POI, name depicted on the at least one road sign, and/or a symbol depicted on the at least one road sign.

4. The driver assistance system according to claim 1, wherein the first and/or second information comprises information about a colour and/or colour combination of the at least one road sign, and/or a distance and/or time from the current position of the motor vehicle to the at least one road sign.

5. The driver assistance system according to claim 1, wherein the first and/or second information comprises information about a combination of at least the form of the at least one road sign, and/or the colour, the colour combination of the at least one road sign, and/or the street name, place name (230), country name, point of interest, POI, name depicted on the at least one road sign, the symbol depicted on the at least one road sign, the distance and/or time from the current position of the motor vehicle to the at least one road sign.

6. The driver assistance system according to claim 1, wherein the first information and the second information correspond to one another.

7. The driver assistance system according to claim 1, wherein the camera unit is adapted to divide the captured environment into a predetermined number of image regions (310, 311, 312) before it matches the captured environment of the motor vehicle with the second information, and to detect the element of the captured environment as the at least one road sign within at least one selected image region of the predetermined number of image regions.

8. The driver assistance system according to claim 1, wherein the third information comprises information about a partial area of the captured environment, wherein the partial area comprises the at least one detected road sign.

9. The driver assistance system according to claim 8, wherein the information about the partial area comprises only the at least one detected road sign.

10. The driver assistance system according to claim 1, wherein the third information comprises information confirming that the camera unit has detected the at least one road sign.

11. A motor vehicle comprising a driver assistance system according to claim 1.

12. A method (500) for outputting traffic information to a driver or a velocity affecting unit of a motor vehicle, comprising the following steps:
accessing (410) map data representing road segments (210) of a road network located in the geographic proximity of the motor vehicle and road signs (220) located on the road segments;
determining (420) a current position of the motor vehicle on a road segment;
providing (430) first information of at least one road sign which is located on a position of a road segment to be traveled by the motor vehicle based on the current position of the motor vehicle;
providing (440) second information of the at least one road sign based on the first information;
capturing (450) an environment of the motor vehicle;
matching (460) the captured environment of the motor vehicle with the second information;
detecting (470) a road sign substantially coinciding with the second information in the captured environment;
providing (480) third information of the at least one detected road sign;
outputting (490) a corresponding signalling to the driver or the velocity affecting unit of the motor vehicle based on the third information provided.

13. The method according to claim 12, wherein the at least one road sign is a road sign which requires a current velocity of the motor vehicle to be adjusted by the driver assistance system, the velocity affecting unit or the driver of the motor vehicle.

14. The method according to claim 12, wherein the first and/or second information comprises information about a form of the at least one road sign and/or a street name, place name (230), country name and/or point of interest, POI, name depicted on the at least one road sign, and/or a symbol depicted on the at least one road sign.

15. The method according to claim 12, wherein the first and/or second information comprises information about a colour and/or colour combination of the at least one road sign, and/or a distance and/or time from the current position of the motor vehicle to the road sign.

16. The method according to claim 12, wherein the first and/or second information comprises information about a combination of at least the form of the at least one road sign, and/or the colour, the colour combination of the at least one road sign, and/or the street name, place name (230), country name, point of interest, POI, name depicted on the at least one road sign, the symbol depicted on the at least one road sign, the distance and/or time from the current position of the motor vehicle to the at least one road sign.

17. The method according to claim 12, wherein the first information and the second information are identical.

18. The method according to claim 12, wherein the captured environment is divided into a predetermined number of image regions (310, 311, 312) before the step of matching the captured environment of the motor vehicle with the second information, and the at least one road sign is detected within at least one selected image region of the predetermined number of image regions.

19. The method according to claim 12, wherein the third information comprises information about a partial area of the captured environment, wherein the partial area comprises the at least one detected road sign.

20. The method according to claim 19, wherein the information about the partial area comprises only the at least one detected road sign.

21. The method according to claim 12, wherein the third information comprises information confirming that the at least one road sign has been detected.

22. A computer program product comprising program code sections for carrying out a method according to claim 12 wherein the computer program product is executed on one or more processing units.

23. The computer program product according to claim 22 which is stored on one or more computer-readable storage media.

\* \* \* \* \*